United States Patent
Prakash et al.

(10) Patent No.: US 11,935,030 B2
(45) Date of Patent: *Mar. 19, 2024

(54) METHOD AND DEVICE FOR CONDUCTING TRUSTED REMOTE PAYMENT TRANSACTIONS

(71) Applicant: Intel Corporation, Santa Clara, CA (US)

(72) Inventors: Gyan Prakash, Beaverton, OR (US); Selim Aissi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 15/604,052

(22) Filed: May 24, 2017

(65) Prior Publication Data

US 2017/0255920 A1    Sep. 7, 2017

Related U.S. Application Data

(63) Continuation of application No. 12/785,138, filed on May 21, 2010, now Pat. No. 9,665,864.

(51) Int. Cl.
*G06Q 20/32*    (2012.01)
*G06Q 20/20*    (2012.01)
(Continued)

(52) U.S. Cl.
CPC ........... *G06Q 20/326* (2020.05); *G06Q 20/20* (2013.01); *G06Q 20/223* (2013.01);
(Continued)

(58) Field of Classification Search
CPC .................... G06Q 20/00–425; H04L 9/00–50
See application file for complete search history.

(56) References Cited

U.S. PATENT DOCUMENTS

| 5,319,542 A | 6/1994 | King, Jr. et al. |
| 5,354,158 A | 10/1994 | Sheldon et al. |

(Continued)

FOREIGN PATENT DOCUMENTS

| CN | 1591499 A | 3/2005 |
| CN | 101527911 A | 9/2009 |

(Continued)

OTHER PUBLICATIONS

Timo, "Thoughts on Nokia's NFC developments," Touch, May 7, 2008, 10 pages.

(Continued)

*Primary Examiner* — Ari Shahabi
(74) *Attorney, Agent, or Firm* — Hanley, Flight & Zimmerman, LLC

(57) ABSTRACT

A method, device, and system for conducting trusted payment transactions including establishing a trust relationship between a first mobile computing device and a second mobile computing device. The first mobile computing device may initiate a payment transaction with a point-of-sale device, communicate with the second mobile communication device to retrieve payment information from the second mobile communication device, and complete the payment transaction with the point-of-sale device using the payment information. The second mobile computing device is configured to verify the user and identity of the first mobile computing device prior to providing the payment information. Communications between the mobile computing devices may be encrypted using pre-determined encryption techniques.

12 Claims, 4 Drawing Sheets

(51) Int. Cl.
  *G06Q 20/22* (2012.01)
  *G06Q 20/38* (2012.01)
  *G06Q 20/40* (2012.01)
  *G06Q 20/42* (2012.01)

(52) U.S. Cl.
  CPC ....... *G06Q 20/3223* (2013.01); *G06Q 20/325* (2013.01); *G06Q 20/3278* (2013.01); *G06Q 20/3823* (2013.01); *G06Q 20/3829* (2013.01); *G06Q 20/40* (2013.01); *G06Q 20/425* (2013.01)

(56) References Cited

U.S. PATENT DOCUMENTS

| | | | |
|---|---|---|---|
| 5,402,336 | A | 3/1995 | Spiegelhoff et al. |
| 6,880,761 | B1 | 4/2005 | Ritter et al. |
| 7,003,495 | B1 | 2/2006 | Burger et al. |
| 7,127,236 | B2 | 10/2006 | Khan et al. |
| 7,434,723 | B1 * | 10/2008 | White .................... G06Q 20/42 235/375 |
| 7,494,067 | B1 | 2/2009 | Zhu |
| 8,401,968 | B1 * | 3/2013 | Schattauer ............. G06Q 20/40 705/44 |
| 9,665,864 | B2 | 5/2017 | Prakash et al. |
| 2001/0029496 | A1 | 10/2001 | Otto et al. |
| 2002/0165831 | A1 | 11/2002 | Horn et al. |
| 2002/0174030 | A1 | 11/2002 | Praisner et al. |
| 2003/0046289 | A1 | 3/2003 | Balasubramanian et al. |
| 2003/0055735 | A1 | 3/2003 | Cameron et al. |
| 2003/0071115 | A1 | 4/2003 | Horn et al. |
| 2004/0029569 | A1 | 2/2004 | Khan et al. |
| 2005/0068178 | A1 | 3/2005 | Lee et al. |
| 2005/0156026 | A1 | 7/2005 | Ghosh et al. |
| 2007/0022058 | A1 | 1/2007 | Abrou et al. |
| 2007/0055632 | A1 | 3/2007 | Hogl |
| 2007/0055635 | A1 | 3/2007 | Kanapur et al. |
| 2007/0116292 | A1 | 5/2007 | Kurita et al. |
| 2007/0244750 | A1 | 10/2007 | Grannan et al. |
| 2007/0255662 | A1 | 11/2007 | Tumminaro |
| 2007/0265984 | A1 | 11/2007 | Santhana |
| 2008/0022101 | A1 | 1/2008 | Sung et al. |
| 2008/0046362 | A1 | 2/2008 | Easterly |
| 2008/0167961 | A1 | 7/2008 | Wentker et al. |
| 2008/0208743 | A1 | 8/2008 | Arthur et al. |
| 2008/0222711 | A1 * | 9/2008 | Michaelis ........... H04L 63/0492 726/7 |
| 2008/0313079 | A1 | 12/2008 | Van Bosch et al. |
| 2009/0070263 | A1 | 3/2009 | Davis et al. |
| 2009/0119181 | A1 | 5/2009 | Pratt et al. |
| 2009/0132813 | A1 | 5/2009 | Schibuk |
| 2009/0143104 | A1 | 6/2009 | Loh et al. |
| 2009/0222383 | A1 | 9/2009 | Tato et al. |
| 2009/0222659 | A1 | 9/2009 | Miyabayashi et al. |
| 2009/0233579 | A1 | 9/2009 | Castell et al. |
| 2009/0276547 | A1 * | 11/2009 | Rosenblatt ............ F01N 3/2073 710/33 |
| 2009/0281945 | A1 | 11/2009 | Shakkarwar |
| 2010/0030695 | A1 | 2/2010 | Chen et al. |
| 2010/0041368 | A1 | 2/2010 | Kumar |
| 2010/0043056 | A1 | 2/2010 | Ganapathy |
| 2010/0082481 | A1 * | 4/2010 | Lin .................... G06Q 20/3278 705/41 |
| 2010/0114731 | A1 | 5/2010 | Kingston et al. |
| 2010/0145850 | A1 | 6/2010 | Nagai et al. |
| 2010/0146607 | A1 | 6/2010 | Piepenbrink et al. |
| 2010/0154032 | A1 * | 6/2010 | Ollmann ............... G06F 21/606 726/22 |
| 2010/0250436 | A1 | 9/2010 | Loevenguth et al. |
| 2010/0260388 | A1 | 10/2010 | Garrett et al. |
| 2011/0131627 | A1 | 6/2011 | Abendroth et al. |
| 2011/0140841 | A1 | 6/2011 | Bona et al. |
| 2011/0191237 | A1 * | 8/2011 | Faith ..................... G06Q 20/40 705/1.1 |

FOREIGN PATENT DOCUMENTS

| | | |
|---|---|---|
| CN | 101656960 A | 2/2010 |
| DE | 10310527 A | 9/2004 |
| DE | 10310527 A1 | 9/2004 |
| EP | 2182493 A1 | 5/2010 |
| JP | 2002-189971 A | 7/2002 |
| JP | 2004110307 A | 4/2004 |
| JP | 2001-258739 A | 9/2004 |
| JP | 2006-209453 A | 8/2006 |
| JP | 2008-269062 A | 11/2008 |
| JP | 2011-530957 A | 12/2011 |
| KR | 2006-0103796 | 10/2006 |
| KR | 2006-0103796 A | 10/2006 |
| KR | 10-2009-0121026 | 11/2009 |
| KR | 2009-0121026 | 11/2009 |
| KR | 10-2009-0122968 | 12/2009 |
| KR | 10-2009-0122968 A | 12/2009 |
| WO | 9011572 A | 10/1990 |
| WO | 9428497 A | 12/1994 |
| WO | 9952066 A1 | 10/1999 |
| WO | 2005086593 A2 | 9/2005 |
| WO | 2009039419 A1 | 3/2009 |
| WO | 2009060393 A | 5/2009 |
| WO | 2009060393 A2 | 5/2009 |
| WO | 2010019353 A2 | 2/2010 |
| WO | 2011146678 A2 | 11/2011 |
| WO | 2011146678 A3 | 11/2011 |

OTHER PUBLICATIONS

Arnall, "Thoughts on Nokia's NFC developments," The Touch Project, May 7, 2008, XP055098485, 10 pages.

"Near Field Communication," Wikipedia, The Free Encyclopedia, retrieved on Apr. 2, 2011, Webpage available at: http://en.wikipedia.org/wiki/Near_field_communication.

"Digital Wallet," Wikipedia, The Free Encyclopedia, retrieved on Apr. 2, 2011, Webpage available at: http://en.wikipedia.org/wiki/Digital_wallet.

Office Action and English Translation for Korean Patent Application No. 2013-0131115, dated Mar. 30, 2017, 6 pages.

Final Rejection in Korean patent application No. 10-2017-0114647, dated Nov. 23, 2018, including machine translation.

Final Rejection in Korean patent application No. 10-2017-0114647, dated Feb. 7, 2019, including machine translation.

Minutes of the oral proceedings in European patent application No. 11250498.0, dated Jun. 24, 2020 (6 pages).

Decision of the Technical Board of Appeals in European patent application No. 11250498.0, dated Jul. 1, 2020 (21 pages).

Provisional decision of the Board of Appeal in European patent application No. 11250498.0, dated Mar. 12, 2020 (13 pages).

United States Patent and Trademark Office, "Notice of Allowance," mailed in connection with U.S. Appl. No. 12/785,138, dated Jan. 17, 2017, 16 pages.

United States Patent and Trademark Office, "Final Office Action," mailed in connection with U.S. Appl. No. 12/785,138, dated Oct. 8, 2015, 26 pages.

United States Patent and Trademark Office, "Non-final Office Action," mailed in connection with U.S. Appl. No. 12/785,138, dated Apr. 9, 2015, 24 pages.

United States Patent and Trademark Office, "Advisory Action," mailed in connection with U.S. Appl. No. 12/785,138, dated Jul. 10, 2012, 2 pages.

United States Patent and Trademark Office, "Final Office Action," mailed in connection with U.S. Appl. No. 12/785,138, dated Apr. 30, 2012, 31 pages.

United States Patent and Trademark Office, "Non-final Office Action," mailed in connection with U.S. Appl. No. 12/785,138, dated Sep. 8, 2011, 27 pages.

International Searching Authority, International Search Report and Written Opinion, issued in connection with International Application No. PCT/US2011/037086, dated Feb. 9, 2012, 10 pages.

State Intellectual Property Office of China, "Official Communication," with English translation, received for Chinese Application No. 201110130193.9, dated Apr. 2, 2014, 19 pages.

(56) References Cited

OTHER PUBLICATIONS

Russian Patent Office, "Official Communication," received for Russian Application No. 2012155628, dated Feb. 13, 2014, 3 pages.

Korean Patent Office, "English translation of Notice of Final Rejection," received for Korean Patent Application No. 2011-0048043, dated Sep. 30, 2013, 5 pages.

European Patent Office, "Search Report," received for European Application No. 11250498.0, dated Jun. 11, 2013, 5 pages.

European Patent Office, "Official Communication," received for European Application No. 11250498.0, dated Jun. 24, 2013, 6 pages.

Korean Patent Office, "English translation of Notice of Preliminary Rejection," received for Korean Patent App. No. 10-2011-0048043, dated Aug. 28, 2012, 4 pages.

European Patent Office, "Result of Consultation," issued by the European Patent Office, European Patent Application No. 11 250 498.0-1958, Sep. 25, 2014, 8 pages.

State Intellectual Property Office of China, "English translation of Notification of Reexamination," received for Chinese Application No. 201110130193.9, dated Jul. 23, 2015, 12 pages.

International Searching Authority, "International Preliminary Report on Patentability," received for PCT Application No. PCT/US2011/037086, dated Dec. 6, 2012, 5 pages.

European Patent Office, "Official Communication," received for European Patent Application No. 11250498.0, dated Feb. 12, 2014, 8 pages.

State Intellectual Property Office of China, "Office Action," with English translation, received for Chinese Patent Application No. 201110130193.9, dated Jan. 31, 2013, 12 pages.

Korean Patent Office, "English translation of Notice of Preliminary Rejection," received for Korean Patent Application No. 2011-0048043, dated Mar. 29, 2013, 7 pages.

State Intellectual Property Office of China, "Office Action, " with English translation, received for Chinese Patent Application No. 201110130193.9, dated Jul. 18, 2013, 24 pages.

State Intellectual Property Office of China, "Office Action," with English translation, received for Chinese Patent Application No. 201110130193.9, dated Aug. 14, 2012, 8 pages.

Japanese Patent Office, "Office Action," with English translation, received for Japanese Patent Application No. 2011-110368, dated Apr. 2, 2013, 9 pages.

State Intellectual Property Office of China, "Decision of Rejection," and English Translation for Chinese Application No. 201110130193.9, dated Apr. 2, 2014, 19 pages.

Russian Patent Office, "Decision of Grant," issued in connection with Russian Patent Application No. 2012155628, dated Oct. 15, 2014, 11 pages.

Korean Patent Office, "Office Action and English Translation," for Korean Patent Application No. 2011-0048043, dated Apr. 28, 2015, 9 pages.

European Patent Office, "Decision to Refuse," for European Patent Application No. 11250498.0-1958, dated Jan. 27, 2015, 23 pages.

Korean Patent Office, "Notice of Preliminary Rejection and English Translation," for Korean Patent Application No. 2013-0131115, dated Sep. 5, 2016, 10 pages.

State Intellectual Property Office of China, "Decision of Reexamination," for Chinese Application No. 201110130193.9, dated Mar. 29, 2016, 23 pages.

State Intellectual Property Office of China, "Office Action", issued in connection with Chinese Patent Application No. 201110130193.9, dated Jul. 23, 2015, (15 pages).

Japanese Patent Office, "Decision to Grant a Patent," issued in connection with Japanese Patent Application No. 2011-110368, dated Sep. 10, 2013 (8 pages).

State Intellectual Property Office of China, "Office Action", issued in connection with Chinese Patent Application No. 201110130193.9, dated Oct. 27, 2015, (13 pages).

Korean Patent Office, "Notice of Preliminary Rejection and English Translation," for Korean Patent Application No. 2017-0114647, dated Feb. 28, 2018, 2 pages.

State Intellectual Property Office of China, "Decision of Reexamination", issued in connection with Chinese Patent Application No. 201110130193.9, dated Mar. 29, 2016, (23 pages).

Japanese Patent Office, "Office Action, with English translation" issued in connection with Japanese Patent Application No. 2011-110368, dated Mar. 25, 2013 (9 pages).

* cited by examiner

METHOD AND DEVICE FOR CONDUCTING TRUSTED REMOTE PAYMENT TRANSACTIONS

CROSS-REFERENCE TO RELATED APPLICATIONS

This application is a continuation of U.S. application Ser. No. 12/785,138, entitled "METHOD AND DEVICE FOR CONDUCTING TRUSTED REMOTE PAYMENT TRANSACTIONS," which was filed on May 21, 2010, now U.S. Pat. No. 9,665,864, issued May 30, 2017.

BACKGROUND

Digital wallets (also known as "e-wallets" or "e-credit card") and other electronic-based personal payment systems allow users to conduct electronic purchases and payment transactions without the necessity of physical credit/charge cards or other standard payment mediums (e.g., personal check). Digital wallets are typically embodied as software and associated hardware (e.g., a smartphone, personal digital assistant, a computer, etc.) on which the user's account information is maintained. Some digital wallets may aggregate multiple credit/charge accounts of the user thereby allowing the user to carry a single electronic device while having access to the multiple credit and charge accounts.

Digital wallets may be used to complete transactions with pre-configured point-of-sale devices. Typically, such point-of-sale devices communicate with the digital wallet using contactless communication. Because the digital wallet is integrally associated with the electronic hardware (e.g., the smartphone) of the user, the smartphone or other electronic device must be physically present and local to the point-of-sale device to complete the payment transaction. As such, the owner of the digital wallet is typically unable to extend use of his or her credit/charge account to another, remote individual (e.g., parent to child) or otherwise authorize the payment of a purchase conducted remotely by another individual.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
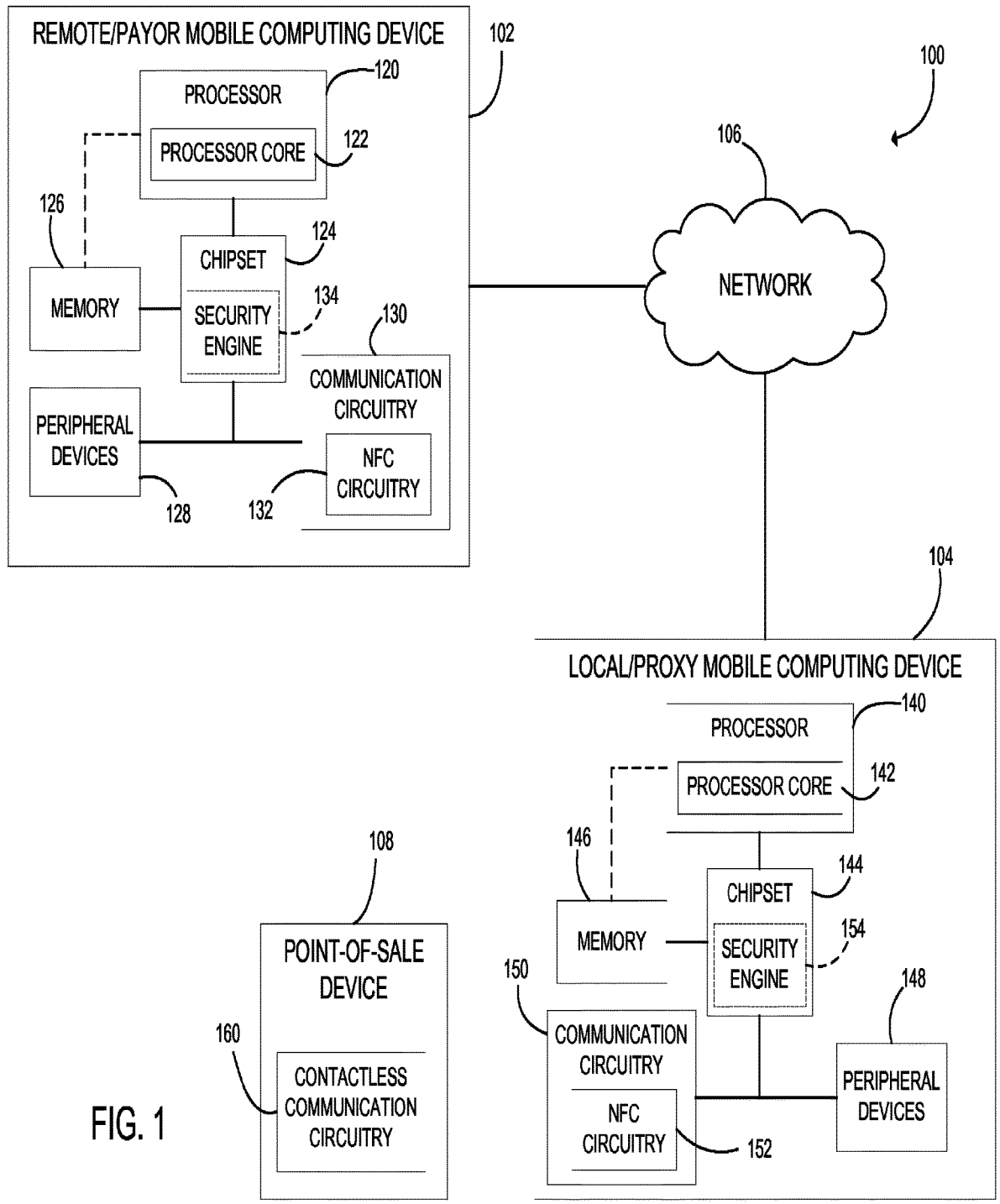
FIG. 1 is a simplified block diagram of one embodiment of a system for conducting trusted, remote payment transactions using mobile computing devices.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a tangible, machine-readable medium, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM); random access memory (RAM); magnetic disk storage media; optical storage media; flash memory devices; and others.

Referring now to FIG. 1, a system 100 for conducting trusted payment transactions includes a remote or payor mobile computing device 102 and a local or proxy mobile computing device 104. In use, as discussed in more detail below, the local mobile computing device 104 acts as a proxy for the remote mobile computing device 102 in payment transactions with a point-of-sale device 108. To do so, the local mobile computing device 104 initiates a payment transaction with the point-of-sale device 108. During the payment transaction, the point-of-sale device 108 may request payment information from the local mobile computing device 104 to complete the payment transaction. In response to such a payment request, the local mobile computing device 104 is configured to communicate with the remote mobile computing device 102 over a network 106 to receive payment information from the device 102, which may be located remotely from the local mobile computing device 104 and the point-of-sale device 108. Because the mobile computing devices 102, 104 have a pre-established trust relationship, such communication may be encrypted or otherwise secured.

After the local mobile computing device 104 receives the payment information from the remote mobile computing device 102, the mobile computing device 104 completes the payment transaction with the point-of-sale device 108 using the payment information. In this way, a user of the remote/payor mobile computing device 102 may authorize use of their payment information (e.g., credit account or charge account information) to a user of the local mobile computing device 104 without being physically present at the point-of-sale device 108. For example, a parent may be the user of the payor mobile computing device 102 and a child of the parent may be the user of the proxy mobile computing device 104. In such embodiments, the parent may remotely authorize, using the payor mobile computing device 102, payment transactions conducted by the child using the proxy mobile computing device 104.

Although only one remote/payor mobile computing device 102, one local/proxy mobile computing device 104, one network 106, and one point-of-sale device 108 are illustratively shown in FIG. 1, the system 100 may include any number of mobile computing devices 102, mobile computing devices 104, networks 106, and point-of-sale devices 108 of similar or dissimilar architecture. For example, the remote computing device 102 may be configured to communicate with multiple local mobile computing devices 104 to allow each device 104 to conduct payment transactions with one or more point-of-sale devices 108 using the payment information provided by the remote/payor mobile computing device 102.

The remote mobile computing device 102 may be embodied as any type of mobile computing device capable of performing the functions described herein. For example, the remote computing device 102 may be embodied as a cellular phone, a smart phone, a mobile internet device, a handheld computer, a laptop computer, a personal digital assistant, a telephony device, or other portable computing device. In the illustrative embodiment of FIG. 1, the remote mobile computing device 102 includes a processor 120, a chipset 124, a memory 126, one or more peripheral devices 128, and communication circuitry 130. In some embodiments, several of the foregoing components may be incorporated on a motherboard of the mobile computing device 102, while other components may be communicatively coupled to the motherboard via, for example, a peripheral port. Furthermore, it should be appreciated that the mobile computing device 102 may include other components, sub-components, and devices commonly found in a computer and/or computing device, which are not illustrated in FIG. 1 for clarity of the description.

The processor 120 of the remote mobile computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the remote mobile computing device 102 may include additional processors 120 having one or more processor cores 122.

The chipset 124 of the remote mobile computing device 102 may include a memory controller hub (MCH or "northbridge"), an input/output controller hub (ICH or "southbridge"), and a firmware device. The firmware device of the chipset 124 may be embodied as a memory device for storing Basic Input/Output System (BIOS) data and/or instructions and/or other information (e.g., a BIOS driver used during booting of the mobile computing device 102). However, in other embodiments, chipsets having other configurations may be used. For example, in some embodiments, the chipset 124 may be embodied as a platform controller hub (PCH). In such embodiments, the memory controller hub (MCH) may be incorporated in or otherwise associated with the processor 120, and the processor 120 may communicate directly with the memory 126 (as shown by the hashed line in FIG. 1).

In some embodiments, the chipset 124 may include a security engine 134. The security engine 134 may be embodied as hardware and/or firmware configured to perform security, encryption, and/or authentication functions as described in more detail below. For example, the security engine 134 may be embodied as or otherwise include an out-of-band processor, a trusted platform module (TPM), and/or other security enhancing hardware and/or associated software modules. As discussed in more detail below, the security engine 134 cooperates with a corresponding security engine 154 of the local mobile computing device 104 to establish a trusted relationship between the mobile computing devices 102, 104.

The processor 120 is communicatively coupled to the chipset 124 via a number of signal paths. These signal paths (and other signal paths illustrated in FIG. 1) may be embodied as any type of signal paths capable of facilitating communication between the components of the mobile computing device 102. For example, the signal paths may be embodied as any number of wires, cables, light guides, printed circuit board traces, via, bus, intervening devices, and/or the like.

The memory 126 of the remote mobile computing device 102 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 126 is communicatively coupled to the chipset 124 via a number of signal paths. Although only a single memory device 126 is illustrated in FIG. 1, in other embodiments, the mobile computing device 102 may include additional memory devices. Various data and software may be stored in the memory device 126. For example, one or more operating systems, applications, programs, libraries, and drivers that make up the software stack executed by the processor 120 may reside in memory 126 during execution. Furthermore, software and data stored in memory 126 may be swapped between the memory 126 and a data storage device of the peripheral devices 128 as part of memory management operations.

The peripheral devices 128 of the remote mobile computing device 102 may include any number of peripheral or interface devices. For example, the peripheral devices 128 may include a display, a keyboard, a mouse, one or more data storage devices such as an internal or external hard drive, and/or other peripheral devices. The particular devices included in the peripheral devices 128 may depend upon, for example, the intended use of the remote mobile computing device 102. The peripheral devices 128 are communicatively coupled to the chipset 124 via a number of signal paths thereby allowing the chipset 124 and/or processor 120 to receive inputs from and send outputs to the peripheral devices 128.

The communication circuitry 130 of the remote mobile computing device 102 may be embodied as any number of devices and circuitry for enabling communications between the remote/payor mobile computing device 102 and the local/proxy mobile computing device 104 over the network 106. The network 106 may be embodied as any number of various wired and/or wireless telecommunication networks. For example, the network 106 may be embodied as or otherwise include one or more cellular networks, telephone networks, local or wide area networks publicly available global networks (e.g., the Internet), or any combination thereof. For example, in one embodiment, the network 106 is embodied as or otherwise includes a Global System for Mobile Communications (GSM) cellular network. Furthermore, the network 106 may include any number of additional devices to facilitate communication between the mobile computing devices 102, 104 such as routers, switches, intervening computers, and/or the like. The mobile computing devices 102, 104 may use any suitable communication protocol to communicate with each other over the network 106 depending on, for example, the particular type of network(s) 106.

The communication circuitry 130 is also communicatively coupled to the chipset 124 via a number of signal paths. The communication circuitry 130 may include one or more wired and/or wireless network interfaces to facilitate communications over the wired and/or wireless portions of the network 106. In some embodiments, the communication circuitry 130 may include Near Field Communications (NFC) circuitry 132. The NFC circuitry 132 may be embodied as relatively short-ranged, high frequency wireless communication circuitry, which may be incorporated in other circuitry of the communication circuitry 130 or separate therefrom. For example, in some embodiments, the effective communication range of the NFC circuitry 132 is no greater than about ten centimeters. The relatively short communication range of the NFC circuitry 132 allows validation of the physical presence of another communication device (e.g., the local/proxy mobile computing device 104) when using the NFC circuitry 132 to communicate. Additionally, the NFC circuitry 132 allows the remote/payor mobile computing device 102 to conduct contactless communication with the local/proxy mobile computing device 104 and other contactless communication-enabled devices (e.g., the point-of-sale device 108).

The local/proxy mobile computing device 104 may be substantially similar to the remote/payor mobile computing device 102 and may be embodied as any type of mobile computing device capable of performing the functions described herein. For example, similar to the remote mobile computing device 102, the local mobile computing device 104 may be embodied as a cellular phone, a smart phone, a mobile internet device, a handheld computer, a laptop computer, a personal digital assistant, a telephony device, or other portable computing device. In the illustrative embodiment of FIG. 1, the local mobile computing device 104 includes a processor 140 having one or more processor cores 142, a chipset 144 including a security engine 154, a memory 146, one or more peripheral devices 148, and communication circuitry 150 including NFC circuitry 152. The components of the illustrative local mobile computing device 104 are substantially similar, although not necessarily identical, to the corresponding components of the remote mobile computing device 102. As such, the above-provided description of the processor 120, the processor core(s) 122, the chipset 124, the memory 126, the peripheral devices 128, the communication circuitry 130, the NFC circuitry 132, and the security engine 134 of the remote/payor mobile computing device 102 is equally applicable to, respectively, of the processor 140, the processor core(s) 142, the chipset 144, the memory 146, the peripheral devices 148, the communication circuitry 150, the NFC circuitry 152, and the security engine 154 of the local/proxy mobile computing device 104 and is not repeated herein for clarity of the description.

In use, as discussed above, the local/proxy mobile computing device 104 may communicate with the remote/payor mobile computing device 102 directly via the NFC circuitry 132, 152 and/or over the network 106. Additionally, the local/proxy mobile computing device 104 may communicate with one or more point-of-sale devices 108 via the NFC circuitry 152 to conduct payment transactions. Such payment transactions may be embodied as any type of transaction in which the point-of-sale device 108 requests payment from the local mobile computing device 104 for services or products delivered by the point-of-sale device 108 or a device or entity associated with the point-of-sale device 108. As such, the point-of-sale device 108 may be embodied as any device configured to communicate with mobile computing devices to request and receive electronic payments. To do so, the point-of-sale device 108 includes a contactless communication circuitry 160, which may be embodied as near field communication circuitry configured to communicate with the NFC circuitry 152 of the local mobile computing device 104. Of course, the point-of-sale device 108 may include other circuitry and devices depending on, for example, the type and use of the point-of-sale device 108. For example, the point-of-sale device 108 may include a processor, memory, data storage device, monitor, keypad or other date entry device, printer, and/or other devices commonly found in point-of-sale devices.

As discussed above, the local mobile computing device 104 may be used to initiate a payment transaction with the point-of-sale device 108 and complete the payment transaction using payment information received from the remote/payor mobile computing device 102. To do so, the local mobile computing device 104 communicates payment requests to and receives the payment information from the remote mobile computing device 102 using secured communications. The payment information may be embodied as any type of information required by the point-of-sale device 108 to complete the payment transaction. For example, the payment information may be embodied as account information of the user or owner of the remote/payor mobile computing device 102 such as credit card account information, charge card account information, bank account information, or other account information that may be used to effect payment of a debit. Such payment information may also include account validation information such as an account password, an account passkey, identification numbers, and/or the like.

Figure 2:
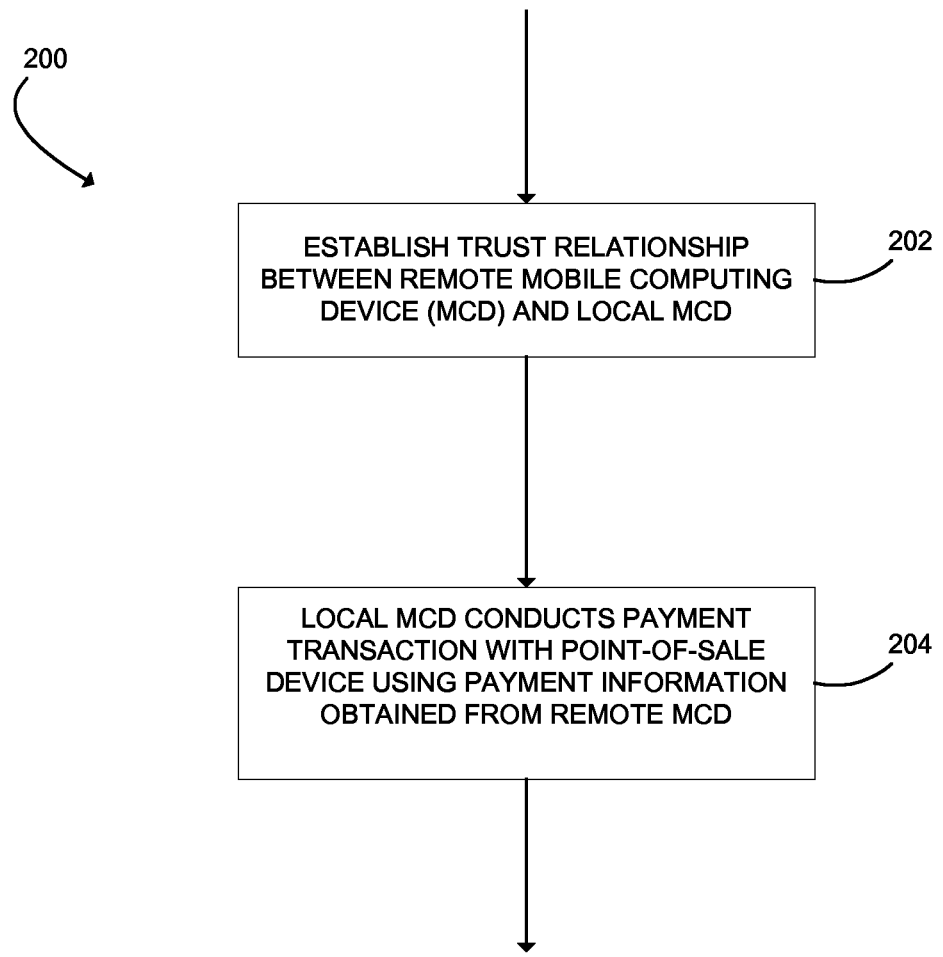
FIG. 2 is a simplified flow diagram of one embodiment of a method for conducting trusted payment transactions using the system of FIG. 1.

Referring to FIG. 2, one illustrative embodiment of a method 200 for conducting trusted payment transactions using the system 100 of FIG. 1 begins with block 202. In block 202, a trust relationship is established between the mobile computing devices 102, 104. Any suitable methodology for establishing a trusted relationship between the devices 102, 104 may be used in block 202. In some embodiments, the NFC circuitry 132, 152 of the devices 102, 104 are used to initially establish the trust relationship by verifying physical presence of the local/proxy mobile computing device 104 relative to the remote/payor mobile computing device 102. The trust relationship may be established for both the local mobile computing device 104 and the user of the local mobile computing device 104 with respect to the remote/payor mobile computing device 102. For example, a password or passkey may be generated, which must be entered on the local mobile computing device 104 before the remote mobile computing device 102 will send the payment information to thereby ensure the proper user is using the local mobile computing device 104.

Figure 3:
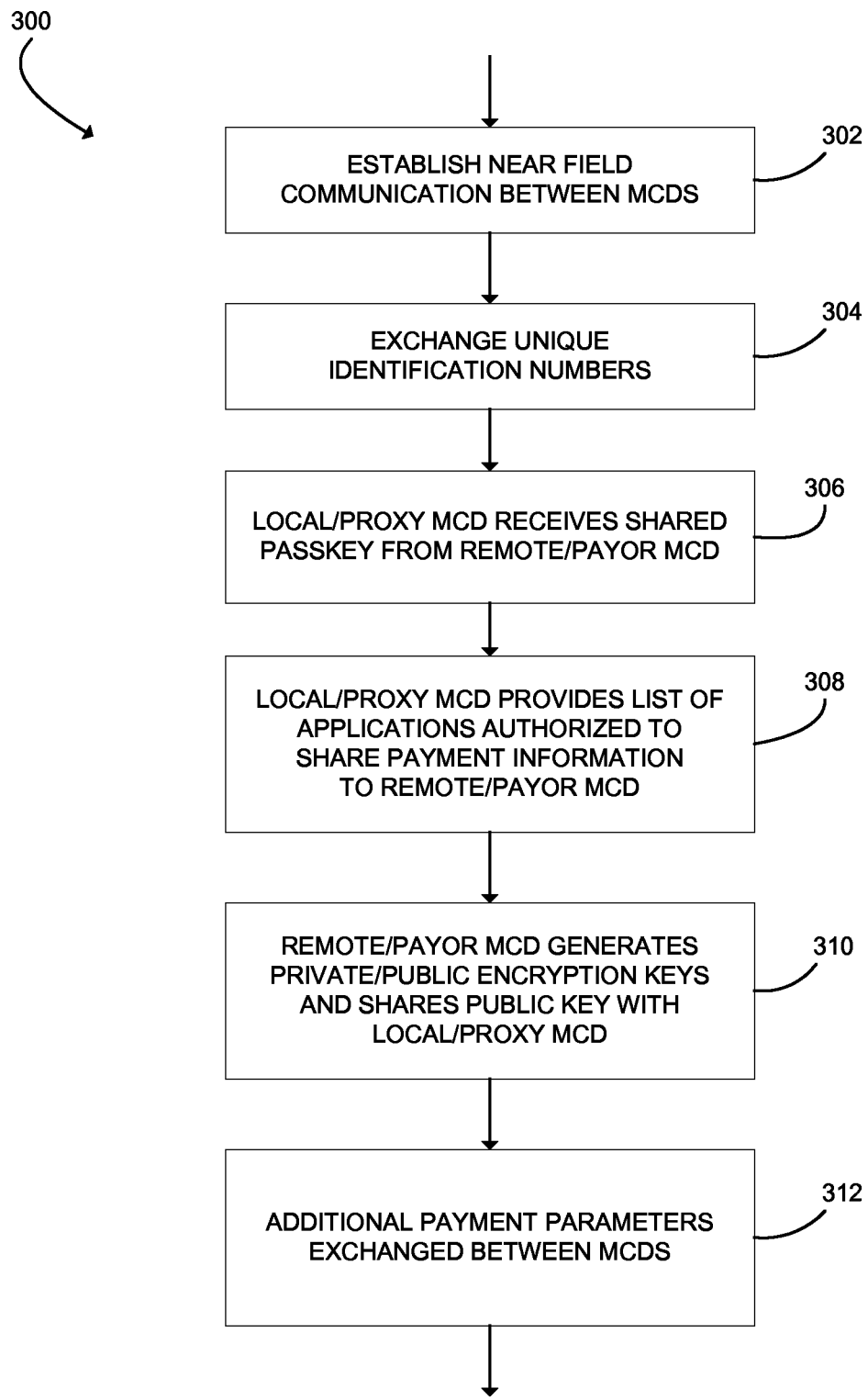
FIG. 3 is a simplified flow diagram of one embodiment of a method for establishing a trusted relationship between the mobile computing devices of FIG. 1.

One illustrative embodiment of a method 300 for establishing a trust relationship between the mobile computing devices 102, 104 is illustrated in FIG. 3. The method 300 begins with block 302 in which a near field communication is established between the mobile computing devices 102, 104. To do so, the devices 102, 104 may be positioned near each other (e.g., within ten centimeters or in physical contact) and the NFC circuitry 132, 152 of the devices 102, 104 may be operated to establish the near field communication. By requiring establishment of near field communication, the physical presence of the local/proxy mobile computing device 104 relative to the remote/payor mobile computing device 102 is ensured. In this way, the identity of the local/proxy mobile computing device 104 to be trusted by the remote/payor mobile computing device 102 is validated.

In block 304, the mobile computing device 102, 104 exchange unique identification numbers. The unique identification numbers may be embodied as any type of numerical/alpha-numerical number that uniquely identifies the respective device 102, 104. For example, in one embodiment, the mobile computing device 102, 104 exchange International Mobile Equipment Identify (IMEI) numbers in block 304. The unique identification numbers may be used to validate the identity of the devices 102, 104 during subsequent communications as described below.

In block 306, the local/proxy mobile computing device 104 receives a shared passkey from the remote/payor mobile computing device 102. The shared passkey may be generated by the remote/payor mobile computing device 102 or by a user of the device 102 or device 104. The shared passkey is used to verify the identity of the person using the local/proxy mobile computing device 104. For example, before communicating with the remote mobile computing device 102 to request the payment information, the user of the local mobile computing device 104 may be prompted to enter the shared passkey, thereby verifying that the authorized person is actually using the device 104. In some embodiments, the shared passkey includes an associated timer that identifies the length of time during which the shared passkey is valid. Upon expiration of the passkey timer, a new passkey must be obtained from the remote/payor mobile computing device 102.

In block 308, the local/proxy mobile computing device 104 transmits or provides a list of software applications that may be executed on the device 104 and which are authorized to communicate with the remote/payor mobile computing device 102 to request the payment information. By providing a predetermined list of software applications that may request the payment information, the remote/payor mobile computing device 102 may verify that the requesting application is not a malicious, unauthorized application executing on the local/proxy mobile computing device 104 or other device.

In block 310, the remote/payor mobile computing device 102 generates a private/public encryption key pair and shares the public key with the local/proxy mobile computing device 104. The encryption keys may be used to encrypt communications between the mobile computing devices 102, 104. Any suitable encryption methodology may be used to generate the private/public encryption key pair. For example, in one embodiment, a Rivest, Shamir, and Adleman (RSA) encryption algorithm may be used. The encryption keys may be generated by and stored in the respective security engines 134, 154, which may also be used to encrypt communication between the devices 102, 104 using the encryption keys.

In block 312, additional payment parameters may be exchanged between the mobile computing devices 102, 104. For example, in some embodiments, a predetermined maximum currency limit may be determined and transmitted to the local mobile computing device 104. Such currency limits may be embodied as an overall total limit and/or a per-transaction limit. Additionally payment parameters based on, for example, time of purchase, location of purchase, types of items/service purchased, and the like may also be exchanged in block 312. Such payment parameters may be used by the local/proxy mobile computing device 104 to determine whether the remote/payor mobile computing device 102 may be requested to pay for a particular payment transaction and also provides the user of the remote/payor mobile computing device 102 an amount of control over the types of transactions being paid for by the user of the device 102.

Referring back to FIG. 2, after a trust relationship has been established between the mobile computing devices 102, 104, the local mobile computing device 104 may conduct one or more payment transactions with one or more point-of-sale devices 108 using payment information obtained from the remote mobile computing device 102 in block 204. In this way, a user of the local mobile computing device 104 may initiate and complete payment transactions for products and/or services with the point-of-sale device 108, which are paid for by the user of the remote mobile computing device 102 using the payment information provided therefrom. For example, a child may use the local mobile computing device 104 to purchase an amount of gasoline or other product/service, which is paid for by their parent (i.e., the user of the remote mobile computing device 102 on which the payment information is stored).

Figure 4:
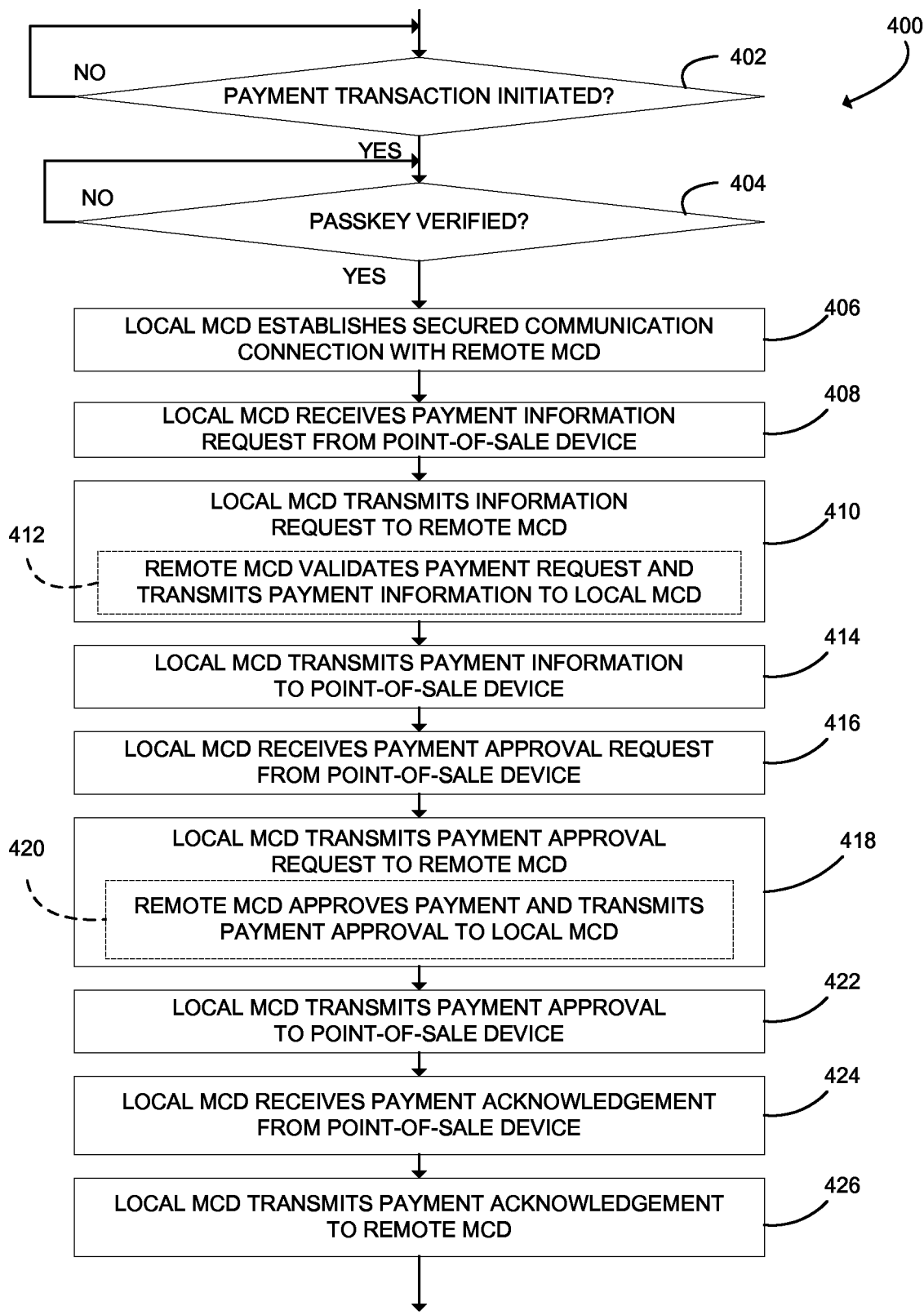
FIG. 4 is a simplified flow diagram of one embodiment of a method for conducting a payment transaction with a point-of-sale device using the mobile computing devices of FIG. 1.

As illustrated in FIG. 4, one embodiment of a method 400 for conducting a payment transaction begins with block 402 in which the local mobile computing device 104 determines whether the user has initiated a payment transaction with a point-of-sale device 108. In embodiments wherein the point-of-sale device 108 includes the contactless communication circuitry 160, the user may initiate the payment transaction by placing the device 104 near the point-of-sale device 108 such that the NFC circuitry 152 and the contactless communication circuitry 160 are able to communicate with each other. However, in other embodiments, the payment transaction may be initiated by other methodologies such as, for example, pressing a key or entering information on a keypad of the point-of-sale device 108.

In block 404, the local mobile computing device 104 prompts the user for entry of the passkey. The user may enter the passkey via a keypad or other suitable input device of the mobile computing device 104. In response, the local mobile computing device 104 compares the entered passkey to the shared passkey received from the remote/payor mobile computing device 102 in block 306 of method 300. If the passkey is not verified, the method 400 loops back to block 404 wherein the user is again requested to enter a valid passkey. In this way, the identification of the user of the local mobile computing device 104 may be verified.

If the entered passkey is verified in block 404, the local mobile computing device 104 establishes a secured communication connection with the remote mobile computing device 102 over the network 106 in block 406. The secured communication connection may be established using, for example, the unique identification numbers and encryption keys exchanged in blocks 304, 308 of the method 300. For example, the remote mobile computing device 102 may verify the transmitted unique identification number matches the number provided by the local mobile computing device 104 during establishment of the trusted relationship. If such numbers do not match, the remote mobile computing device 102 may terminate the communication connection or take other defensive action.

In block 408, the local mobile computing device 104 receives a payment request from the point-of-sale device 108. The payment request may be in response to previous interaction with the point-of-sale device 108 such as receipt of goods or services provided by the point-of-sale device 108 or a device or entity associated with the device 108. The payment request may include a request for account or other payment information to which the total cost of the product/service is to be billed. In response to receiving the payment request, the local mobile computing device 104 transmits the payment request to the remote mobile computing device 102 in block 410. Such communication may be encrypted or otherwise secured using the shared public encryption key as discussed above.

In block 412, the remote mobile computing device 102 validates the payment request using the data exchanged with the local mobile computing device 104 during establishment of the trust relationship. For example, the remote mobile computing device 102 may be configured to verify the unique identification number (e.g., the IMEI number) of the local mobile computing device 104, verify that the passkey has been entered correctly, and/or verify other parameters established in the method 300. If the payment request is verified, the remote mobile computing device 102 transmits the payment information to the local mobile computing device 104 in block 412. As discussed above, the payment information may be embodied as any type of information required by the point-of-sale device 108 to complete the payment transaction. For example, the payment information may be embodied as account information of the user or owner of the remote/payor mobile computing device 102 such as credit card account information, charge card account information, bank account information, or other account information that may be used to effect payment of a debit.

After the local mobile computing device 104 has received the payment information from the remote mobile computing device 102, the local mobile computing device 104 transmits the payment information to the point-of-sale device 108 in block 414. In response, the point-of-sale device 108 conducts the payment transaction and transmits a payment approval request to the local mobile computing device 104 in block 416. The local mobile computing device 104 forwards the approval request to the remote computing device 102 in block 418.

In block 420, the remote mobile computing device 102 approves the payment based on the approval request. To do so, as discussed above, the remote mobile computing device 102 may verify that the requested currency amount does not exceed a predetermined threshold and/or verify other parameters established in the method 300. If the payment is approved, the remote mobile computing device 102 transmits the a payment approval to the local mobile computing device 104 in block 420.

After the local mobile computing device 104 has received the payment approval from the remote mobile computing device 102, the local mobile computing device 104 transmits the payment approval to the point-of-sale device 108 in block 414. In response, the point-of-sale device 108 completes the payment transaction and transmits a payment acknowledgement to the local mobile computing device 104 in block 424. The local mobile computing device 104 forwards the payment acknowledgement to the remote computing device 102 in block 426, which may store the payment acknowledgement for future reference. In this way, the local mobile computing device 104 is usable to complete a payment transaction with a point-of-sale device 108 local to the device 104 using payment information stored on and obtained from the remote mobile computing device 102, which may be located remotely from the point-of-sale device 108.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A mobile phone comprising:
near field communication circuitry;
cellular communication circuitry;
a processor; and
memory, wherein the memory stores instructions that, when executed by the processor, cause the processor to;
  cause a trust relationship to be established, at a first time, between the mobile phone and a second mobile phone over a Near Field Communication link by verifying a physical presence of the second mobile phone relative to the mobile phone, the physical presence indicative of the mobile phone and the second mobile phone inside a communication range of the Near Field Communication link;
  generate a shared passkey, at the first time, based on the established trust relationship;
  send the shared passkey, at the first time, to the second mobile phone over the Near Field Communication link;
  generate a public/private key pair, at the first time, based on the established trust relationship;
  send the public key, at the first time, to the second mobile phone over the Near Field Communication link;
  receive a list of applications, at the first time, from the second mobile phone;
  determine ones of the list of applications that are authorized to request payment information on the second mobile phone;
  join, based on the public key and the shared passkey, a secured connection with the second mobile phone over a cellular network at a second time after the first time, the cellular network different from the Near Field Communication Link, wherein the mobile phone and the second mobile phone are outside the communication range of the Near Field Communication link;
  receive the shared passkey using the cellular network, at the second time, from the second mobile phone;
  verify an identity of the second mobile phone using the received shared passkey;

access a payment request over the cellular network after the second time, the payment request initiated by an action associated with at least one of the ones of the applications that are authorized to request payment information on the second mobile phone;

validate the payment request based on the established trust relationship; and in response to validating the payment request based on the trust relationship, transmit, to the second mobile phone and over the cellular network, the payment information including account information associated with a user of the mobile phone.

2. The mobile phone of claim 1, wherein the instructions, when executed by the processor, further cause the processor to cause the trust relationship to be established between the mobile phone and the second mobile phone by exchanging, between the mobile phone and the second mobile phone, unique identification numbers that identify the mobile phone and the second mobile phone.

3. The mobile phone of claim 1, wherein the instructions, when executed by the processor, further cause the processor to cause the trust relationship to be established between the mobile phone and the second mobile phone by sending payment parameters to the second mobile phone, the payment parameters including at least one of a maximum currency amount per transaction or a time period during which the payment information may be obtained from the mobile phone.

4. One or more non-transitory, machine readable media comprising instructions that, when executed by a processor of a first mobile phone, cause the processor to:

cause a trust relationship to be established, at a first time, between the first mobile phone and a second mobile phone over a Near Field Communication link by verifying a physical presence of the second mobile phone relative to the first mobile phone, the physical presence indicative of the first mobile phone and the second mobile phone inside a communication range of the Near Field Communication link;

generate a shared passkey, at the first time, based on the established trust relationship;

send the shared passkey, at the first time, to the second mobile phone over the Near Field Communication link;

generate a public/private key pair, at the first time, based on the established trust relationship;

send the public key, at the first time, to the second mobile phone over the Near Field Communication Link;

retrieve a list of applications, at the first time, from the second mobile phone;

determine ones of the list of applications that are authorized to request payment information on the second mobile phone;

join, based on the public key and the shared passkey, a secured connection with the second mobile phone over a cellular network at a second time after the first time, the cellular network different from the Near Field Communication Link, wherein the first mobile phone and the second mobile phone are outside the communication range of the Near Field Communication link;

receive the shared passkey via the cellular network, at the second time, from the second mobile phone;

verify an identity of the second mobile phone using the received shared passkey;

access a payment request over the cellular network after the second time, the payment request initiated by an action associated with at least one of the ones of the applications that are authorized to request payment information on the second mobile phone;

validate the payment request based on the established trust relationship; and in response to validating the payment request based on the trust relationship, transmit, to the second mobile phone and over the cellular network, the payment information including account information associated with a user of the first mobile phone.

5. The one or more non-transitory machine readable media of claim 4, wherein the instructions, when executed by the processor, further cause the processor to establish the trust relationship between the first mobile phone and the second mobile phone by exchanging, between the first mobile phone and the second mobile phone, unique identification numbers that identify the first mobile phone and the second mobile phone.

6. The one or more non-transitory machine readable media of claim 4, wherein the instructions, when executed by the processor, further cause the processor to establish the trust relationship between the first mobile phone and the second mobile phone by sending a shared passkey to the second mobile phone.

7. The one or more non-transitory machine readable media of claim 4, wherein the instructions, when executed by the processor, further cause the processor to establish the trust relationship between the first mobile phone and the second mobile phone by sending payment parameters to the second mobile phone, the payment parameters including at least one of a maximum currency amount per transaction or a time period during which the payment information may be obtained from the first mobile phone.

8. A method comprising:

establishing, by executing an instruction with at least one processor, at a first time, a trust relationship between a first mobile phone and a second mobile phone over a Near Field Communication link by verifying a physical presence of the second mobile phone relative to the first mobile phone, the physical presence indicative of the first mobile phone and the second mobile phone inside a communication range of the Near Field Communication link;

generating, by the first mobile phone, a shared passkey, at the first time, based on the established trust relationship;

sending, by the first mobile phone, the shared passkey, at the first time, to the second mobile phone over the Near Field Communication link;

generating, by the first mobile phone, a public/private key pair, at the first time, based on the established trust relationship;

sending, by the first mobile phone, the public key, at the first time, to the second mobile phone over the Near Field Communication link;

receiving, by the first mobile phone, at the first time, a list of applications from the second mobile phone;

determining, by the first mobile phone, ones of the list of applications that are authorized to request payment information on the second mobile phone;

joining, by the first mobile phone, based on the public key and the shared passkey, a secured connection with the second mobile phone over a cellular network at a second time after the first time, the cellular network different from the Near Field Communication Link, wherein the first mobile phone and the second mobile phone are outside the communication range of the Near Field Communication link;

receiving, by the first mobile phone, the shared passkey using the cellular network, at the second time, from the second mobile phone;

verifying, by the first mobile phone, an identity of the second mobile phone using the received shared passkey;

accessing, by the first mobile phone and from the second mobile phone over the cellular network after the second time, a payment request, the payment request initiated by an action associated with at least one of the ones of the applications that are authorized to request payment information on the second mobile phone;

validating, by the first mobile phone, the payment request based on the established trust relationship; and in response to validating the payment request based on the trust relationship, transmitting, by the first mobile phone and to the second mobile phone over the cellular network, the payment information including account information associated with a user of the first mobile phone.

9. The method of claim 8, wherein establishing the trust relationship between the first mobile phone and the second mobile phone includes exchanging, between the first mobile phone and the second mobile phone, unique identification numbers that identify the first mobile phone and the second mobile phone.

10. The method of claim 8, wherein establishing the trust relationship between the first mobile phone and the second mobile phone includes sending payment parameters to the second mobile phone for establishing the trust relationship, the payment parameters including at least one of a maximum currency amount per transaction or a time period during which the payment information may be obtained from the first mobile phone.

11. A mobile phone comprising:
near field communication circuitry;
cellular communication circuitry;
a processor; and
memory, wherein the memory stores instructions that, when executed by the processor, cause the processor to:
cause a trust relationship to be established between the mobile phone and a second mobile phone over a Near Field Communication link by verifying a physical presence of the mobile phone relative to the second mobile phone, the second mobile phone being a trusted mobile phone, the physical presence indicative of the mobile phone and the trusted mobile phone inside a communication range of the Near Field Communication link;
receive a shared passkey, at the first time based on the established trust relationship, from the second mobile phone over the Near Field Communication link;
receive a public key of a public/private key pair, at the first time based on the established trust relationship, from the second mobile phone over the Near Field Communication link;
send a list of applications to the second mobile phone at the first time to determine ones of the list of applications that are authorized to request payment information on the mobile phone;
receive the shared passkey via at least one input on the mobile phone;
join, based on the public key and the shared passkey, a secured connection with the second mobile phone over a cellular network at a second time after the first time, the cellular network different from the Near Field Communication link, wherein the mobile phone and the second mobile phone are outside the communication range of the Near Field Communication link;
send the shared passkey via the cellular network, at the second time, from the mobile phone to the second mobile phone to verify an identity of the mobile phone;
initiate a payment transaction with a point-of-sale device;
receive a payment request from the point-of-sale device in response to initiation of the payment transaction with the point-of-sale device;
transmit, in response to initiation of the payment transaction, the payment request received from the point-of-sale device to the trusted mobile phone over the cellular network to validate the payment request based on the established trust relationship, wherein the mobile phone and the trusted mobile phone are outside the communication range of the Near Field Communication link;
receive the payment information from the trusted mobile phone in response to transmittal of the payment request, wherein the payment information includes account information associated with a user of the trusted mobile phone and the payment information is associated with at least one of the ones of the applications that are authorized to request the payment information on the second mobile phone; and
complete the payment transaction with the point-of-sale device based on the trust relationship using the payment information received from the trusted mobile phone.

12. The mobile phone of claim 11, further including a security engine, wherein to establish the trust relationship with the trusted mobile phone security engine is to:
transmit a unique identification number of the mobile phone to a corresponding security engine of the trusted mobile phone using the near field communication circuitry;
receive a unique identification number of the trusted mobile phone from the corresponding security engine of the trusted mobile phone using the near field communication circuitry; and
store the unique identification number of the trusted mobile phone.

* * * * *